United States Patent
Moradell et al.

[19]

[11] Patent Number: 6,113,051
[45] Date of Patent: Sep. 5, 2000

[54] SLIDE FOR AUTOMOBILE VEHICLE SEATS

[75] Inventors: Pierre Moradell, Georges des Groseillers; Michel Timon, Fleury sur Orne, both of France

[73] Assignee: Bertrand Faure Equipments S.A., Boulogne Cedex, France

[21] Appl. No.: 09/023,122

[22] Filed: Feb. 13, 1998

[30]    Foreign Application Priority Data

Feb. 13, 1997 [FR]    France .................................. 97 01842

[51] Int. Cl.$^7$ ................................................. F16M 13/00
[52] U.S. Cl. ........................ 248/430; 296/68.1; 297/344.1
[58] Field of Search ................................... 248/430, 429, 248/424, 548, 900; 296/68.1, 65.14; 297/344.1, 472, 473; 384/47

[56]                References Cited

U.S. PATENT DOCUMENTS

| | | | |
|---|---|---|---|
| 4,712,759 | 12/1987 | Sugama et al. | 248/429 |
| 4,804,229 | 2/1989 | Nishino | 297/471 |
| 5,772,173 | 6/1998 | Couasnon | 248/430 |
| 5,806,825 | 9/1998 | Couasnon | 248/429 |
| 5,931,436 | 8/1999 | Rohee | 248/430 |

FOREIGN PATENT DOCUMENTS

| | | |
|---|---|---|
| 0 094 438 | 11/1983 | European Pat. Off. . |
| 0408932 | 6/1990 | European Pat. Off. . |
| 2736311 | 1/1997 | France . |
| 30 42 379 | 6/1982 | Germany . |
| 39 35 359 | 5/1991 | Germany . |
| 42 42 895 | 11/1993 | Germany . |

*Primary Examiner*—Ramon O. Ramirez
*Assistant Examiner*—Kimberly T. Wood
*Attorney, Agent, or Firm*—Pollock, Vande Sande & Amernick

[57]                ABSTRACT

The slide includes a fixed section and a movable section sliding in the fixed section. An edge of the fixed section, equipped with a row of notches, is located in the direct vicinity of a sidewall of the movable section. A lock, movable crosswise to the sliding direction, is equipped with teeth guided in the cutouts made in the wall and mating with the notches to lock the slide. The wall includes a stop, such as a folded portion, located opposite the edge. The dimensions and the material of the teeth are determined so that when a sliding force exceeding a predetermined value is applied, the teeth deform by deflecting parallel to the folded portion and their ends are then located opposite the folded portion preventing the lock from unlocking.

9 Claims, 4 Drawing Sheets

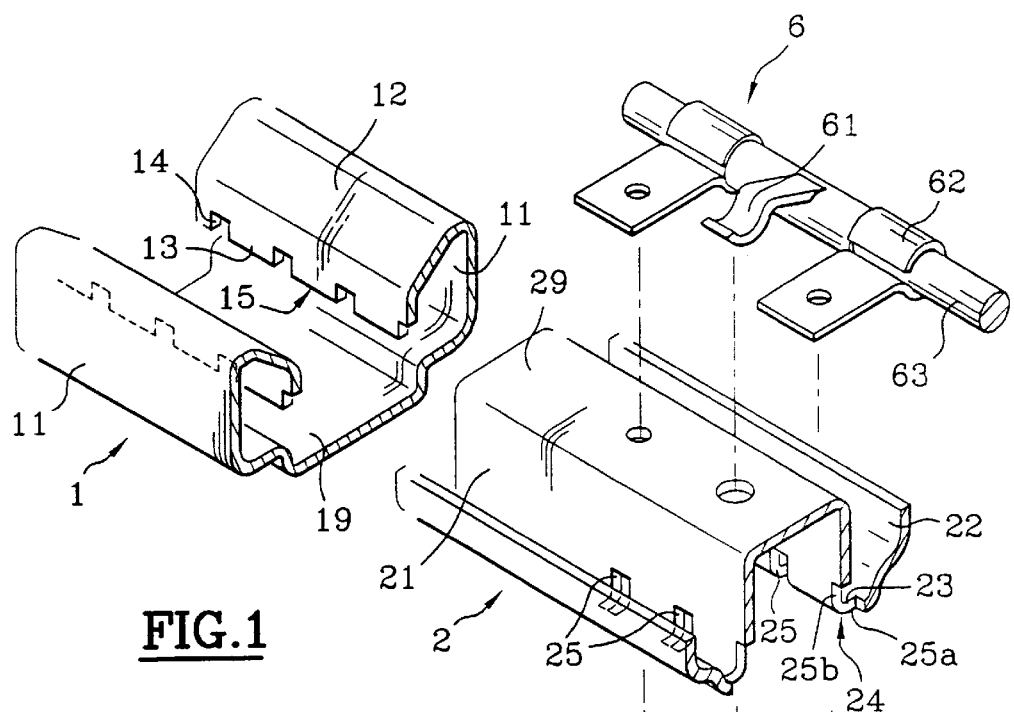
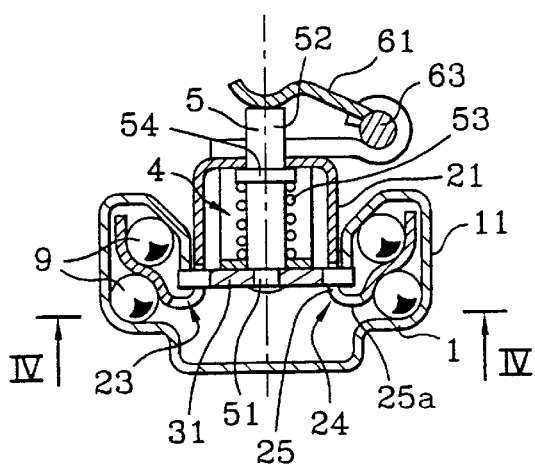
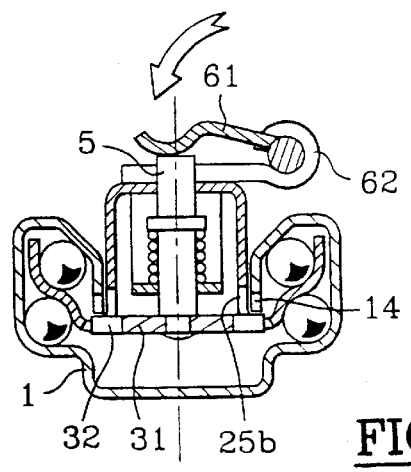
FIG.1
FIG.2
FIG.3 under loading, with the notches of the fixed section even in the event of deformation.

SLIDE FOR AUTOMOBILE VEHICLE SEATS

FIELD OF THE INVENTION

This invention concerns a slide for automobile vehicle seats and, more especially, the locking in position of such a slide.

BACKGROUND OF THE INVENTION

Such slides, used to adjust the longitudinal position of a seat, conventionally include a fixed section, attached to the floor of the vehicle, and a movable section, attached to the frame of the seat and sliding longitudinally in relation to the fixed section. Locking means, conventionally attached to the movable section, ensure the locking of the movable section on the fixed section, in the position chosen by the user, by mating with the notches of at least one row of notches made on the said fixed section.

The locking thus made must ensure reliable securing of the seat in relation to the vehicle, especially during impacts or accidents which may have a tendency to move the seat forwards or rearwards.

We already know of various slide systems consisting of a male section sliding in relation to a female section.

According to a first type of slide, the male section constitutes the fixed section, attached to the floor, and the female section is attached to the frame of the seat. Locking is then ensured by a lock attached to the female section in the longitudinal sliding direction and movable crosswise to this direction by means of unlocking control elements. The lock conventionally includes several teeth which engage with the notches of the male profile and are maintained in position by elastic recall means to ensure the locking. The unlocking control elements enable the teeth of the lock to be disengaged from the notches to enable the female section to slide and therefore the adjustment of the position of the seat.

In a second type of slide, the male section is attached to the frame of the seat and the female section is attached to the floor. The lock is then connected to the male section and its teeth mate with the notches of the female section.

French patent document FR-A-2 736 311 describes a slide of the latter type where the female section is generally U-shaped in section, has two flanges which extend towards the inside of the section by inner flange returns, and the male section is also generally U-shaped in section, the flanges of which are located between the inner flange returns of the female section and extend towards the outside by outer flange returns which are folded under the inner flange returns of the female section, and extend respectively between the latter and the flanges of the female section.

The outer flange returns of the male section constitute, with the flanges and inner flange returns of the female section, raceways for balls facilitating the relative sliding of the male and female sections. The locking means include a lock consisting of an elastically flexible strip, for example made of spring steel, placed on the inside of the slide and attached at one end to the male section. The other end of this strip includes, on each side, locking teeth which are guided, crosswise to the sliding direction, in the cutouts made in the angles formed by the flanges and the outer flange returns of the male section and which mate, in locking position, with the notches of the two rows of notches made respectively on the edges of the inner flange returns of the female section. Unlocking is ensured by an arm of a control bar, which penetrates into the slide and the end of which acts on the lock to disengage the teeth from the notches by deflecting the blade crosswise to the sliding direction, return to locking position being ensured by the elastic recall of the said strip when the bar is released. The locking ensured by this system is especially resistant to forces tending to make the male section slide, thanks especially to the fact that the rows of notches of the female section are located directly against the wall of the male section in which the teeth guide cutouts are made and, therefore, the loads mainly generate shear stresses on the teeth, excluding all other stresses on the lock itself or its attachment.

The principle of this locking system, consisting in transforming the relative movement forces of the two sections of a slide into shear stresses in the teeth of the lock, can be applied to other types of slides than those described in the above mentioned document, in particular to slides of the first type mentioned above.

However, during an accident, the lock may move to the unlocking position under the effect of an impact and the seat may then slide.

The aim of this invention is to solve this problem and, especially, to provide, in addition to the high locking resistance mentioned above, high reliability and an improvement in safety by preventing all unwanted unlocking.

BRIEF DESCRIPTION OF THE INVENTION

With these targets in mind, the subject of the invention is a slide for automobile vehicle seats, of the type including a fixed section, intended to be attached to the floor of the vehicle, and a movable section, intended to be attached to the seat and which can slide longitudinally in relation to the fixed section, and locking means to prevent sliding, the fixed section including an edge equipped with a row of locking notches and located in the direct vicinity of a sidewall of the movable section, locking means including a lock movable in a direction parallel to the wall and crosswise to the sliding direction, between a locking position and an unlocked position, the lock being equipped with teeth which pass through the said sidewall by entering into the respective cutouts made in the wall, the teeth being guided in the cutouts during the movements of the lock and mating, in locking position, with the notches of the row of notches.

According to the invention, this slide is characterised in that the sidewall includes stop means, located on the sides of the cutouts and opposite the edge of the fixed section, and in that the dimensions and material of the teeth are determined so that, during a sliding force exceeding a predetermined value, when the lock is in locking position, the teeth can deform by deflecting in the sliding direction, the ends of the teeth thus deformed being moved facing with the stop means.

Thus, during an impact generating a high force tending to move the seat horizontally and tending therefore to make the movable section slide on the fixed section, the slight movement which results causes the teeth of the lock to bend by plastic deformation. The result is that the end portion of each tooth is at least partially offset sideways in relation to the cutout and is therefore located facing with the stop means. The teeth, thus retained by the stop means, ensure self-locking of the lock preventing any movement of the lock towards its unlocking position. Of course, the height of the teeth must be determined, according to the geometry of the sections, so that, on the one hand, the bending of the teeth is not prevented by the stop means, that is to say, in locked position, that the ends of the teeth are offset, in lock movement direction, in relation to the stop means, and that, on the other hand, the teeth remain correctly engaged with the notches, which will be easily ensured provided that the height of the teeth is greater than the clearance between the edge of the fixed section equipped with notches and the stop means.

For the locking system described in the above mentioned French Patent document FR-A 2 736 311, the lock preferably consists of a spring steel strip, and the teeth, cut directly into this strip, have a high shear strength, and therefore are not or are only slightly deformable. In comparison, according to the invention, the material used for the lock will be selected to enable the above mentioned deformation, for example a steel softer than spring steel. The locking resistance will however not be significantly reduced due to the fact that, even after deformation, the forces will still be converted into shear stresses only, stresses to which even steels more malleable than spring steel offer very good resistance.

Preferably, the stop means are formed by a folded portion of the sidewall, in which the cutouts are prolonged to enable the withdrawal of the teeth from the notches in unlocked position.

According to a preferential arrangement, the folded portion forms with the sidewall a more or less a right angle, the edge of the fixed section being located in the said angle, in the direct vicinity of the wall and the folded portion, the teeth being located at the level of the folded portion in unlocked position and offset in relation to the folded portion in locking position.

According to a specific arrangement, the fixed section is a female section, generally U-shaped in section, with two flanges prolonged by inner flange returns folded towards the inside of the slide, and the notches are made on the edge of at least one of the inner flange returns, and the movable section is a male section also U-shaped in section, the flanges of which include outer flange returns, which mate under the inner flange returns of the female section, with at least one of the flanges of the male section constituting the sidewall and the corresponding outer flange return forming the folded portion, and the lock consists of a plate located on the inside of the slide. Preferably, the plate has teeth on each side, and the cutouts (25) and the rows of notches (14) are made on the two sides of the slide. The advantage of these arrangements is that the lock is placed inside the slide where it is therefore protected and, in addition, improve the strength by ensuring the locking of the two sides of the slide which also distributes the stresses over a higher number of teeth.

In the locking system described in above mentioned French Patent document FR-A 2 736 311, the end of the lock including the teeth, also called a comb plate, moves in fact along a more or less circular trajectory and the comb plate may not be located exactly parallel to the row of notches in locking position. The result is then that certain teeth are not perfectly engaged with the corresponding notches on the fixed section, which would be detrimental to the safety ensured by the self-locking mentioned earlier.

In order to get around this problem, according to another preferential arrangement of the invention, the movable section includes guide means to guide the lock in a direction perpendicular to the sliding direction.

Thus, all the teeth of the lock always exactly extend parallel to the sliding direction and therefore to the rows of notches guaranteeing mating of all the teeth with the notches of the fixed section.

Other characteristics and advantages of the invention will appear in the description which will be given as an example of a slide in compliance with the invention and a design variant ensuring a more accurate adjustment in position with an adjustment pitch lower than the pitch of the notches of the fixed section.

BRIEF DESCRIPTION OF THE DRAWINGS

Refer to the appended drawings on which:

FIG. 1 is a partial exploded view of the slide in compliance wit the invention,

FIG. 2 is a cross-sectional view of the slide in locked position,

FIG. 3 is a view similar to that of FIG. 2, in an unlocking position,

DETAILED DESCRIPTION OF THE INVENTION

Figure 4:
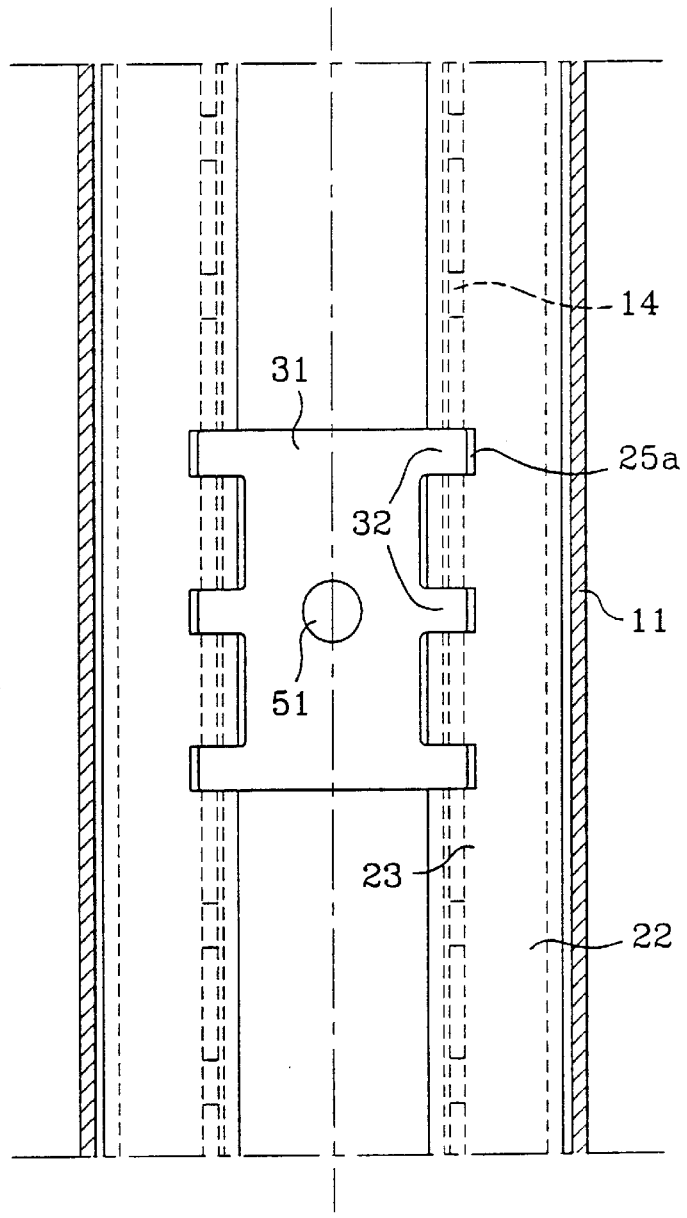
FIG. 4 is a top cross-sectional view through line IV–IV of FIG. 2 showing the lock in its normal operating condition.
Figure 5:
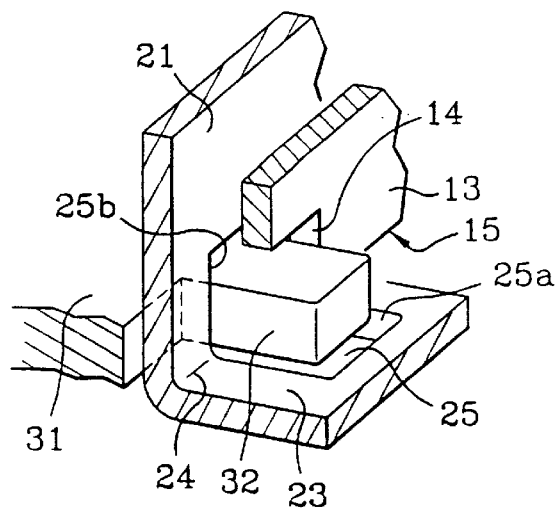
FIG. 5 is a perspective detail view showing the mating of a tooth of the lock with a notch of the female section, FIGS. 6 and 7, corresponding to FIGS. 4 and 5 respectively, showing the condition of the lock after an impact which caused the teeth to deform.

The slide shown on FIG. 1 includes the female section 1, intended to be attached to the floor, not shown, of an automobile vehicle, and a male section 2 intended to be attached to the frame, also not shown, of the seat.

The female section 1, made for example from a bent steel sheet, is generally U-shaped in section and includes two flanges 11, constituting two sidewalls, more or less vertical, and a horizontal bottom 19. The flanges 11 are prolonged at their upper edges by inner flange returns 12, facing towards the inside of the U and towards the bottom 19 of the female section 1. The longitudinal edges 13 of these flange returns extend vertically, and a row of notches 14 is made on each of these edges.

The male section 2 is also generally U-shaped in section and has two flanges 21 extending vertically downwards from the top 29, attachable, in a manner known itself, to the frame of the seat. The flanges 21 are prolonged by outer flange returns 22, facing upwards and located, when the male and female sections are assembled, as can be seen on FIGS. 2 and 3, between the respective flanges and flange returns of the female section 1. The flanges and the flange returns of the two sections are shaped so as to form raceways for the balls 9 facilitating the relative sliding of the two sections. The inner flange returns 12 of the female section are also shaped so that the edges 14 extend against the flanges 21 of the male section with minimum lateral clearance.

Each outer flange return 22 of the male section is attached to the corresponding flange 21 of the said male section by a wall area consisting of a folded portion 23 which extends more or less horizontally from the lower edge of the flange 21 thus forming, with the wall comprising the said flange, an angle 24 of approximately 90°.

The edge 13 of the inner flange return 12 extends downwards to the direct vicinity of the folded portion 23.

The slide also includes locking means 3 which include a lock consisting of a plate 31 or comb plate, equipped on each side with a number of teeth 32. The plate 31 extends horizontally inside the slide, and between the flanges 21 of the male section 2 and its teeth 32 engage in the respective cutouts 25 made in the male section at level of angle 24. A part 25a of this cutout is therefore located in the folded portion 23 and another part 25b is located in the wall constituting the flange 21 of the male section.

In locked position, shown on FIG. 2, the teeth 32 also mate with the notches 14 of the female section and are located above the folded portion 24, therefore disengaged from the part 25a of the cutout made in the said folded portion.

In unlocked position, shown on FIG. 3, the teeth 32 are disengaged from the notches 14 but remain engaged with the cutouts 25.

The lock is movable perpendicular to the longitudinal direction of the slide, that is to say vertically, between the locked position and the unlocked position, the teeth remaining guided in the respective cutouts with a minimum functional clearance during the movement of the lock 31.

The movement of the lock is controlled by a control rod 5 extending vertically and on the lower end 51 of which the plate 31 is attached, for example by riveting. The rod 5 is guided axially in guide means consisting for example of a stirrup 4 placed inside the male section 2 and attached to the top 29 of the latter. The rod 5 slides in a bore made in the wall of this stirrup and in another bore made in the top of the male section. It includes a collar 54 on which a spring 53 bears, this spring being installed around the rod 5 between the said collar 54 and the stirrup 4. The spring 53 ensures the elastic recall of the lock 31 into locked position and retains it in this position during the normal use of the slide. The unlocking control means 6 include a lever 61 attached to a control shaft 63 installed so as to pivot in bearings 62 attached to the bottom 29 of the male section, on the outside of the slide. During normal use, the downwards movement of the lock 31, to unlock the slide, is controlled by pivoting the control shaft 63, for example by a handle, not shown, which causes lever 61 to bear on the upper end 52 of the rod 5 (see FIG. 3). After the position of the slide has been adjusted, relocking is achieved automatically under the effect of the spring 53.

Figure 6:
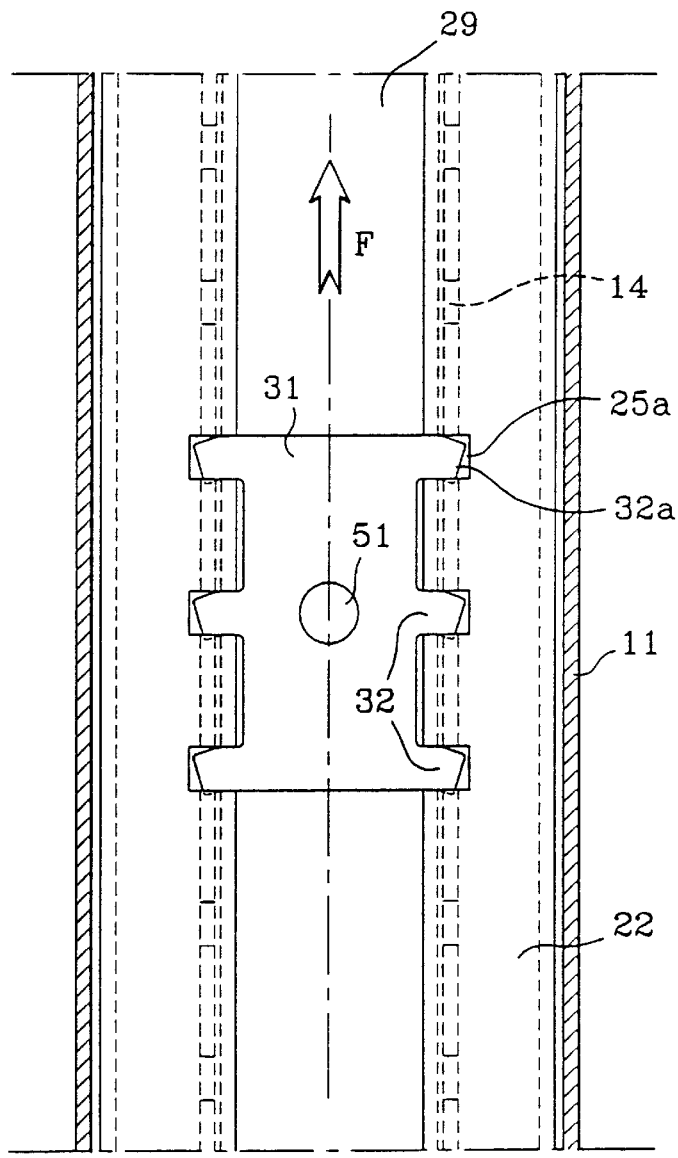
Figure 7:
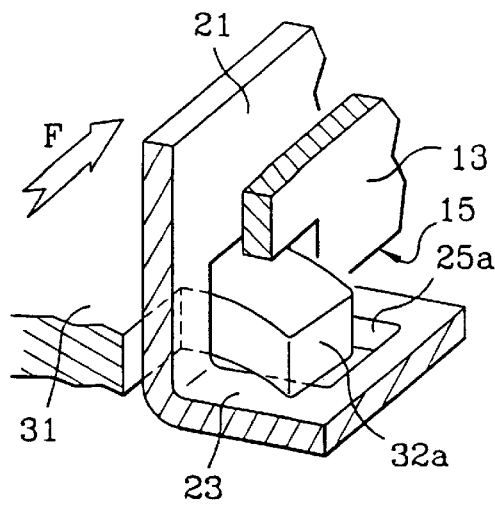

FIGS. 6 and 7 show the deformation of the teeth 32 of the lock when a high deceleration of the vehicle, for example in the case of an accident, tends to move the seat and generates high forces F on the locking system. The ends 32a of the teeth 32, engaged with the notches 14 of the female section, are then deformed by bending and are then located, at least partially, above the folded portion 23. This means that the lock can no longer move downwards and therefore all unwanted unlocking is impossible after the teeth have been deformed.

The material and the dimensions of the teeth are determined so that this deformation occurs when the force to which they are subjected reaches a predetermined threshold. Also, the height of the teeth is determined so that this deformation can occur when the lock is in locked position, that is, in practice, the height of the teeth is lower than the height of the part of the cutout 25b located in the flange 21. The distance between the bottom 15 of end 13 of the female section and the upper face of the folded portion 23 must also be lower than the height of the teeth.

FIGS. 8 to 11 show a design variant of the slide, using several locks 31a, 31b and 31c movable independently of each other.

Such an arrangement especially provides a position adjustment possibility with an adjustment pitch lower than the pitch of the notches 14 of the female section. The general principle of systems offering such a possibility, called "differential lock" is already known. It is only recalled here that the principle consists in using several locking elements offset, in the longitudinal direction of the slide, by a distance different from a full multiple of the pitch of the notches of the fixed section, that is to say a distance equal to an integer multiple of the pitch of the notches to which is added a fraction of this pitch dependent on the number of locks used, that is to say a distance $d = K * p + p * (n-1)/n$, where K is an integer, p is the pitch of the notches, and n is the number of locks. Systems of this type operate as follows: from an adjustment position where a locking element is engaged with the notches of the fixed section, and at least one other locking element is not engaged due to the offset mentioned above, a movement of the movable section over a distance lower than the pitch of the notches is sufficient to align the locking element which was not previously engaged with the notches. For more information concerning the design and the operation of such differential lock systems, refer especially to documents EP-A-408 932, U.S. Pat. No. 4,712,759 or DE-A-4 242 895 again to French patent application No. 95 13370.

Figure 10:
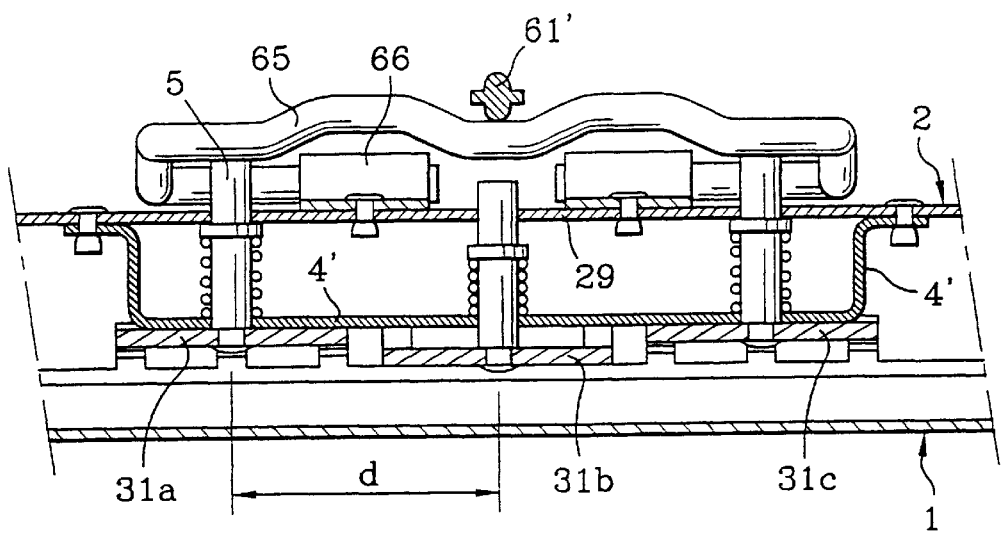
FIG. 10 is a partial cross-sectional view through the vertical central plane of a design variant using the three-lock system of FIG. 8 and adapted to reduce the adjustment pitch.
Figure 11:
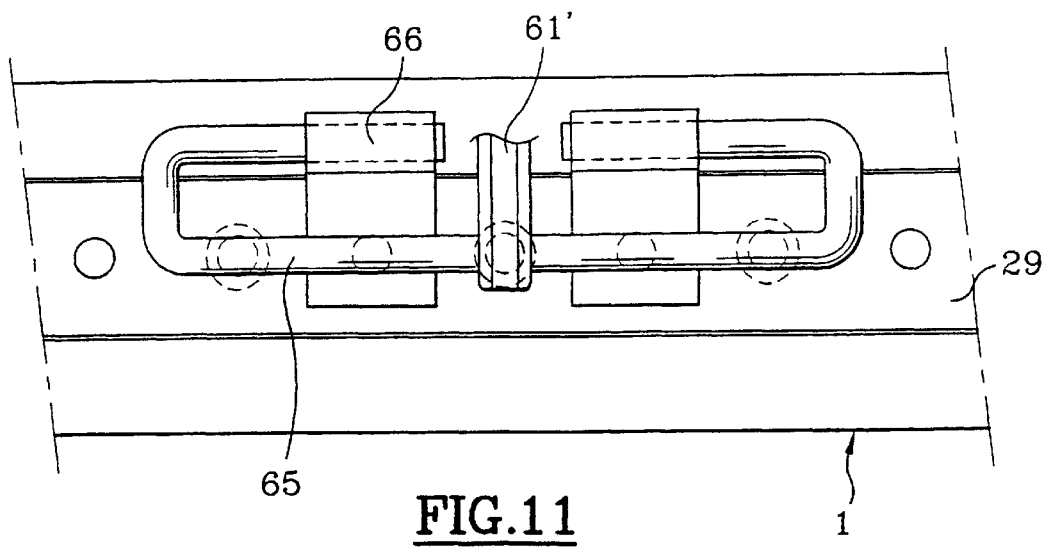
FIG. 11 is a top view of the slide shown on FIG. 10.

This principle is therefore used in the design variant shown on FIGS. 10 and 11, using three locks 31a, 31b and 31c. Each of these locks is installed on the male section in a manner similar to that which was described previously in relation to FIGS. 1 to 3, using a single stirrup 4' to guide the rods 5 supporting the locks. As can be seen on FIG. 10, the lock 31a is in up position, its teeth being engaged therefore with the notches of the fixed section, and lock 31b, which is offset in relation to the lock 31a by a distance d different from a notch pitch multiple, is in down position, on account of the fact that its teeth cannot mate with the notches, as can be easily understood.

The unlocking control means here consist of a ring-shaped part 65 installed so as to pivot in the bearings 66 attached to the movable section 2. The ring is shaped so as to bear on the three rods 5, when a lever 61', or a similar control element, is actuated to pivot the ring downwards. Such an action therefore places all the locks in unlocked position. The male section can then be moved over a distance, for example lower than the pitch of the notches, where lock 31b can then mate with the notches, whereas the lock 31a will remain in down position.

Figure 8:
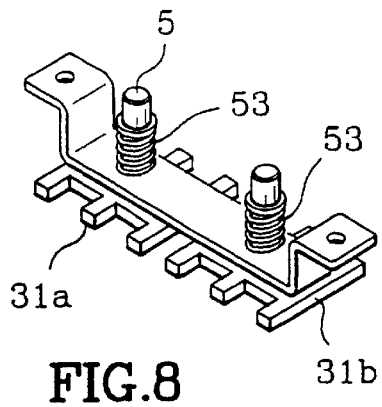
FIG. 8 is a detail view of a locking system using two locks installed in parallel and movable independently of each other.
Figure 9:
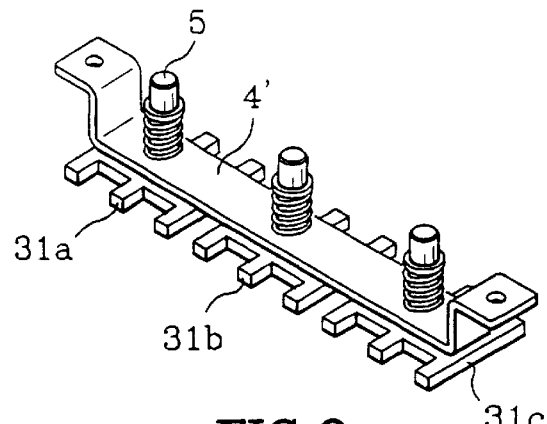
FIG. 9 is a similar view of a system with three locks.

Although the description above was made in relation to a locking system using three locks, it can be easily understood that a similar operation would be obtained using a system with only two locks as shown on FIG. 8, or any other number of locks.

The invention is not limited to the arrangements and shapes of slides and locks described above only as an example. The invention could apply to any type of slide with the characteristics defined in the preamble of claim 1, that is especially even in the case of a lock located on the outside of the slide or again in the case where the male section would be fixed and the female section movable. The adaptations required for each type of slide and each type of lock could be achieved without difficulty by a person skilled in the art. The system described in document FR-A-2736311 could also be easily modified in compliance with the invention, for example by replacing the portion including the teeth of the spring strip by an added part comprising a lock in compliance with the invention, attached to the end of the said strip.

What is claimed is:

1. Slide for automobile vehicle seats comprising:

a fixed section intended to be attached to the floor of the vehicle, a movable section intended to be attached to the seat and which can slide longitudinally in relation to the fixed section, locking means to prevent this sliding movement, the fixed section including an edge equipped with a row of locking notches located in the direct vicinity of a sidewall of the movable section, the locking means including a lock movable in a direction parallel to the sidewall and substantially perpendicular to a direction the sliding movement, between a locking position and an unlocked position, the lock being equipped with teeth, engaging respective cutouts made in the sidewall, the teeth being guided in the cutouts during the movements of the lock and removably mating in a locking position, with the notches of the row of notches, wherein the are formed in the sidewall and extend into a folded portion cutouts, the dimensions and material of the teeth determined so that, during a sliding force exceeding a predetermined value, when the lock is in the locking position, the teeth can deform by deflecting in the sliding direction, the ends of the teeth thus deformed being moved in overlying abutment with the folded portion.

2. Slide, in accordance with claim 1, wherein the folded portion substantially forms, with the sidewall, a right angle, the edge of the fixed section being located in the angle, in the direct vicinity of the sidewall and the folded portion, the teeth being located at the level of the folded portion in the unlocked position and offset in relation to the folded portion in the locking position.

3. Slide, in accordance with claim 1, wherein the fixed section is a female section that is generally U-shaped in section with two flanges extended by inner flange returns folded towards the inside of the slide, and the notches are made on the edge of at least one of the inner flange returns, and the movable section is a male section also U-shaped in section, with second flanges of which include outer flange returns which engage under the inner flange returns of the female section, at least one of the flanges of the male section comprising the sidewall, the corresponding outer flange return forming the folded portion, and the lock including a plate located inside the slide.

4. Slide, in accordance with claim 3, wherein the plate includes teeth on each side, and further wherein the cutouts and the rows of notches are made on the two sides of the slide.

5. Slide, in accordance with claim 1 wherein the movable section includes guide means to guide the lock in a direction perpendicular to the sliding direction.

6. Slide, in accordance with claim 5, wherein the lock is attached to an inner end of a control rod sliding in the guide means, the outer end of the rod protruding beyond the slide.

7. Slide, in accordance with claim 6, and further comprising elastic recall means of the lock in the locked position and unlocking control means including a level installed so as to pivot in bearings attached to the movable section and acting on the outer end of the control rod.

8. Slide, in accordance with claim 1, further comprising several locks which can move independently of each other.

9. Slide, in accordance with claim 8, wherein the teeth of a lock are offset longitudinally in relation to those of another lock by a distance equal to $K * p + p * (n-1)/n$, K being an integer, p being the pitch of the notches and n being the number of locks.

* * * * *

UNITED STATES PATENT AND TRADEMARK OFFICE
CERTIFICATE OF CORRECTION

PATENT NO.    : 6,113,051
DATED         : September 5, 2000
INVENTOR(S)   : Michel Timon et al.

It is certified that error appears in the above-identified patent and that said Letters Patent is hereby corrected as shown below:

<u>Column 7,</u>
Line 12, the sentence should read:
-- to a direction of the sliding movement, between a locking --;
Line 19, the sentence should read:
-- wherein the cutouts are formed in the sidewall and extend into a --
Line 20, the sentence should read:
-- folded portion, the dimensions and material of --.

Signed and Sealed this

Twentieth Day of May, 2003

JAMES E. ROGAN
*Director of the United States Patent and Trademark Office*